(12) United States Patent
Segawa et al.

(10) Patent No.: US 11,899,280 B2
(45) Date of Patent: Feb. 13, 2024

(54) OPTICAL SYSTEM AND IMAGING DEVICE

(71) Applicant: TAMRON CO., LTD., Saitama (JP)

(72) Inventors: Toshiya Segawa, Saitama (JP); Yuki Mori, Saitama (JP); Hirofumi Tabata, Saitama (JP)

(73) Assignee: Tamron Co., Ltd., Saitama (JP)

( * ) Notice: Subject to any disclaimer, the term of this patent is extended or adjusted under 35 U.S.C. 154(b) by 209 days.

(21) Appl. No.: 17/479,150

(22) Filed: Sep. 20, 2021

(65) Prior Publication Data

US 2022/0171159 A1  Jun. 2, 2022

(30) Foreign Application Priority Data

Nov. 30, 2020  (JP) .................. 2020-197993

(51) Int. Cl.
| | |
|---|---|
| *G02B 15/14* | (2006.01) |
| *G02B 7/02* | (2021.01) |
| *G02B 9/60* | (2006.01) |
| *G02B 7/04* | (2021.01) |
| *G02B 27/00* | (2006.01) |

(52) U.S. Cl.
CPC ................ *G02B 9/60* (2013.01); *G02B 7/04* (2013.01); *G02B 27/0025* (2013.01)

(58) Field of Classification Search
CPC ......... G02B 7/04; G02B 9/60; G02B 27/0025
USPC .................. 359/676–706, 822–826
See application file for complete search history.

(56) References Cited

U.S. PATENT DOCUMENTS

| | | | |
|---|---|---|---|
| 10,281,735 B2 | 5/2019 | Ishibashi | |
| 2005/0141103 A1* | 6/2005 | Nishina | G02B 9/60 359/715 |
| 2013/0135514 A1* | 5/2013 | Maetaki | G02B 9/04 348/340 |
| 2015/0054988 A1* | 2/2015 | Kimura | G02B 15/1425 359/680 |
| 2016/0147048 A1* | 5/2016 | Nakano | G02B 13/146 359/683 |

FOREIGN PATENT DOCUMENTS

| | | |
|---|---|---|
| JP | 2001-337265 A | 12/2001 |
| JP | 2018-040858 A | 3/2018 |

* cited by examiner

*Primary Examiner* — Mahidere S Sahle
(74) *Attorney, Agent, or Firm* — Paratus Law Group, PLLC

(57) ABSTRACT

There is provided: an optical system including a focus lens group having positive refractive power and configured to move along an optical axis when focusing from an infinite-distance object to a short-distance object, and satisfying predetermined conditional expressions; and an imaging device including the optical system. The focus lens group includes a lens subgroup A, an aperture stop, and a lens subgroup B in order from the object side. The lens subgroup A includes a negative lens, a positive lens, and a positive lens in order from the image side. The lens subgroup B includes a negative lens and a positive lens in order from the object side.

9 Claims, 11 Drawing Sheets

OPTICAL SYSTEM AND IMAGING DEVICE

CROSS-REFERENCE TO RELATED APPLICATIONS

This application is based on and claims the benefit of priority from Japanese Patent Application No. 2020-197993, filed on Nov. 30, 2020, the entire contents of which are incorporated herein by reference.

BACKGROUND OF THE INVENTION

Technical Field

The present invention relates to an optical system and an imaging device.

Related Art

Conventionally, imaging devices have been used in various fields such as single lens reflex cameras, digital cameras, video cameras, surveillance cameras, and industrial cameras. In either field, the number of pixels of image sensors is increasing, and commensurately bright and high-resolution optical systems are required. In recent years, industrial cameras, particularly an industrial camera for machine vision (FA/MV), which is connected to an image analysis device and used for inspection by image analysis, have become increasingly important. In particular, an industrial camera that can sense not only external structure of an object but also the inside of the object with a light beam of a wide wavelength range from the visible light range to the near-infrared range is attracting attention. Such an imaging device requires an optical system with high imaging performance in which aberrations are well corrected in a wide wavelength range from the visible light range to the near-infrared range.

For example, JP 2018-40858 A discloses an optical system in which the front and back of the aperture stop are positive groups and the F value is about 1.45. JP 2001-337265 A discloses an optical system in which the front and back of the aperture stop are a negative group and a positive group, respectively, and the F value is about 1.6.

In this way, the optical systems disclosed in JP 2018-40858 A and JP 2001-337265 A implement bright optical systems with a large aperture. However, the correction of various aberrations in the entire range from the visible light range to the near-infrared range is not sufficient.

Therefore, an object of the present invention is to provide an optical system and an imaging device that are bright and have high imaging performance in which various aberrations are well corrected in the entire range from the visible light range to the near-infrared range.

SUMMARY OF THE INVENTION

To solve the above-described problem, an optical system according to the present invention includes a focus lens group having positive refractive power and configured to move along an optical axis when focusing from an infinite-distance object to a short-distance object. The focus lens group includes a lens subgroup A, an aperture stop, and a lens subgroup B in order from the object side. The lens subgroup A includes a negative lens, a positive lens, and a positive lens in order from the image side. The lens subgroup B includes a negative lens and a positive lens in order from the object side. The optical system satisfies following conditional expressions:

$$-0.045 < \theta IRp - \theta IRn < 0.045 \quad (1)$$

$$0.50 < Fb/F < 2.50 \quad (2)$$

where $\theta IRp$ is an average value of $(nF-nd)/(n1700\,nm-nd)$ of all positive lenses disposed in the lens subgroup B, $\theta IRn$ is an average value of $(nF-nd)/(n1700\,nm-nd)$ of all negative lenses disposed in the lens subgroup B, nF is a refractive index on an F line, nd is a refractive index on a d line, n1700 nm is a refractive index at a wavelength of 1700 nm, Fb is a focal length on the d line of the lens subgroup B, F is a focal length on the d line of the optical system.

To solve the above-described problem, an imaging device according to the present invention includes the optical system and an image sensor that converts an optical image formed by the optical system into an electrical signal.

The present invention can provide an optical system and an imaging device that are bright and have high imaging performance in which various aberrations are well corrected in the entire range from the visible light range to the near-infrared range.

DESCRIPTION OF THE EMBODIMENTS

Figure 1:
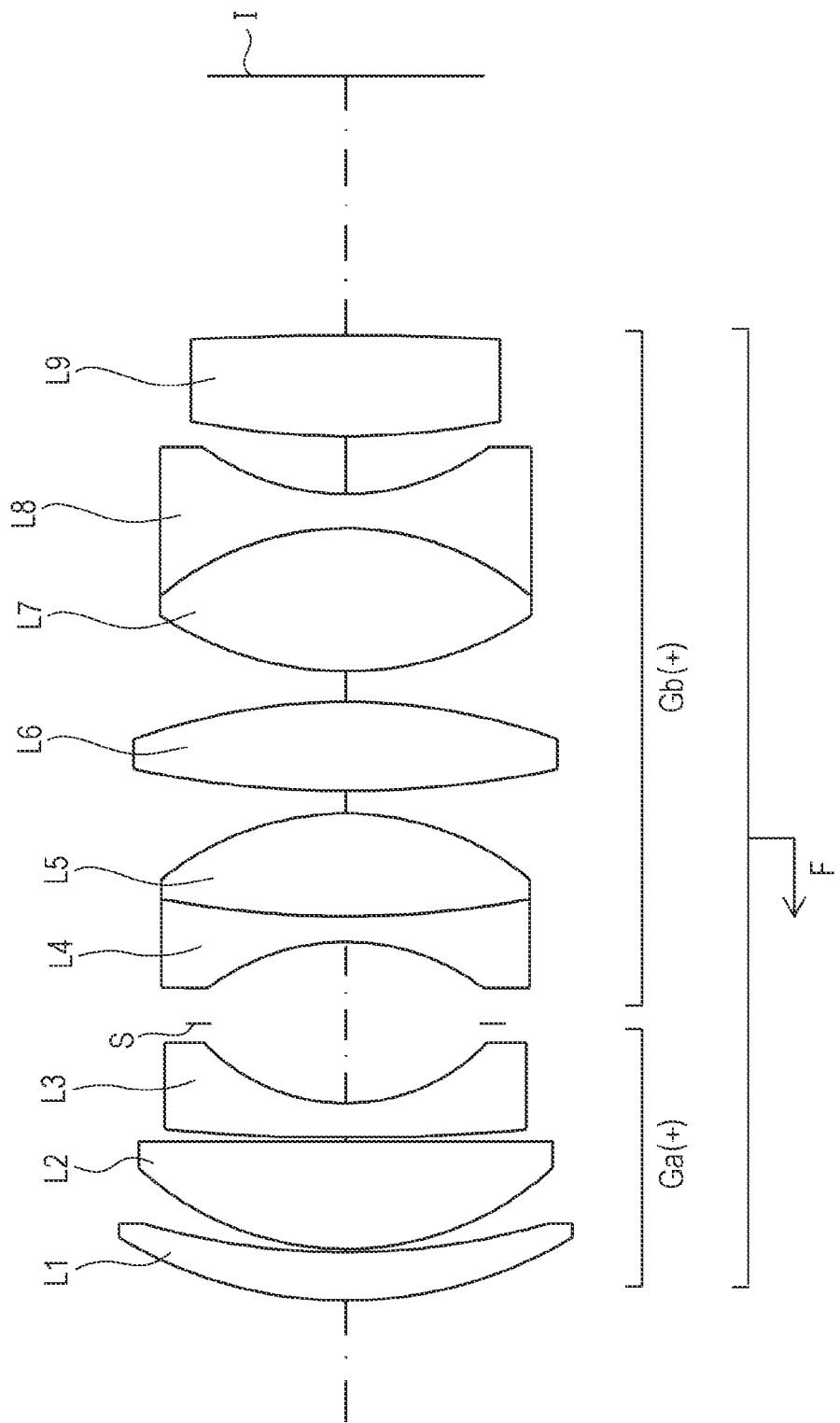
FIG. 1 is a cross-sectional view of an optical system according to a first embodiment.

Embodiments of an optical system and an imaging device according to the present invention will be described below. However, the optical system and the imaging device described below are one aspect of the optical system and the imaging device according to the present invention. The optical system and the imaging device according to the present invention are not limited to the following aspect.

1. Optical System 1-1. Optical Configuration

The optical system includes a focus lens group having positive refractive power and configured to move along an optical axis when focusing from an infinite-distance object to a short-distance object. The focus lens group includes a lens subgroup A, an aperture stop, and a lens subgroup B in order from the object side. The lens subgroup A includes a negative lens, a positive lens, and a positive lens in order from the image side. The lens subgroup B includes a negative lens and a positive lens in order from the object side. By adopting such an optical configuration and satisfying at least one conditional expression described later, it is possible to obtain an optical system that is bright and has high imaging performance with aberrations corrected well from the visible light range to the near-infrared range.

(1) Focus Lens Group

The focus lens group is an in-focus group including an aperture stop and a plurality of lenses that integrally moves along the optical axis when focusing from an infinite-distance object to a short-distance object. The focus lens group has positive refractive power. As long as the focus lens group includes the aperture stop and includes the lens subgroup A and the lens subgroup B each having the above configuration in front and back of the aperture stop, other configurations are not limited. The adoption of this configuration makes it possible to inhibit aberration fluctuations associated with focusing, and to maintain good imaging performance from an infinite-distance object to a short-distance object regardless of object distance.

Here, it is preferable that the focus lens group is an in-focus group disposed on the most object side in the optical system. The optical system may include an in-focus group in addition to the focus lens group. However, the in-focus group refers to a group including one or more lenses that are moved along the optical axis when focusing from an infinite-distance object to a short-distance object.

(2) Lens Subgroup A

The lens subgroup A includes lenses disposed on the object side of the aperture stop in the focus lens group. The lens subgroup A is required at least to include a negative lens, a positive lens, and a positive lens in order from the image side. Additionally, the lens subgroup A may also include one or more lenses. In the lens subgroup A disposed on the object side of the aperture stop, spherical aberration and field curvature can be well corrected by adopting the configuration. The lens subgroup A may have positive refractive power or negative refractive power, but it is more preferable to have positive refractive power.

(3) Lens Subgroup B

The lens subgroup B includes lenses disposed on the image side of the aperture stop in the focus lens group.

The lens subgroup B is required at least to include a negative lens and a positive lens in order from the object side. Additionally, the lens subgroup B may also include one or more lenses. In the lens subgroup B disposed on the image side of the aperture stop, chromatic aberration on the axis can be well corrected by adopting the configuration. The lens subgroup B may have positive refractive power or negative refractive power, but it is more preferable to have positive refractive power.

(4) Surfaces in Front and Back of Aperture Stop

It is preferable that the surface on the most image side of the lens subgroup A is concave with respect to the aperture stop, and that the surface on the most object side of the lens subgroup B is concave with respect to the aperture stop. By forming the surfaces in front and back of the aperture stop in such a shape, the surfaces are symmetrical with respect to the aperture stop, and coma aberration and distortion can be well corrected.

(5) Fixed Lens Group

The optical system may substantially include only the above-described focus lens group, but may include a fixed lens group fixed in the optical axis direction when focusing from an infinite-distance object to a short-distance object on the object side of the focus lens group. It is preferable that the fixed lens group has substantial refractive power, and in particular, it is preferable that the fixed lens group includes a negative lens and a positive lens in order from the object side. Disposing such a fixed lens group on the object side of the focus lens group makes it possible to well correct distortion while ensuring a wide angle of view.

The fixed lens group may have positive refractive power or negative refractive power, but it is more preferable to have positive refractive power.

1-2. Conditional Expressions

It is preferable that the optical system adopts the above-described configuration and satisfies at least one of the conditional expressions described below.

1-2-1. Conditional Expression (1)

$$-0.045 < \theta IRp - \theta IRn < 0.045 \qquad (1)$$

where $\theta IRp$ is an average value of $(nF-nd)/(n1700\text{ nm}-nd)$ of all positive lenses disposed in the lens subgroup B.

$\theta IRn$ is an average value of $(nF-nd)/(n1700\text{ nm}-nd)$ of all negative lenses disposed in the lens subgroup B.

nF is a refractive index on the F line, and the F line refers to light with a wavelength of 486.1300 nm.

nd is a refractive index on the d line, and the d line refers to light with a wavelength of 587.5618 nm.

n1700 nm is a refractive index at a wavelength of 1700 nm,

Conditional Expression (1) described above is an expression regarding dispersion characteristics of the positive lens and the negative lens included in the lens subgroup B. Satisfying Conditional Expression (1) makes it possible to well correct chromatic aberrations in the entire range from the visible light range to the near-infrared range, and to obtain an optical system with high imaging performance in which various aberrations are well corrected in the entire range from the visible light range to the near-infrared range. Note that the value of Conditional Expression (1) described above may be 0.

In contrast, in either case where the value of Conditional Expression (1) is equal to or greater than the upper limit or equal to or less than the lower limit, it is difficult to well correct chromatic aberrations in the entire range from the visible light range to the near-infrared range. As a result, even if the chromatic aberration can be corrected well in the visible light range, the chromatic aberration correction in the near-infrared range is insufficient or excessive, or conversely, even if the chromatic aberration can be corrected well in the near-infrared range, the chromatic aberration correction in the visible light range is insufficient or excessive, which is not preferable.

In order to obtain the above-described effect, as the lower limit of Conditional Expression (1), −0.040 is more preferable, and −0.035 is further preferable. As the upper limit of Conditional Expression (1), 0.040 is more preferable, and 0.035 is further preferable. Note that when adopting the preferable lower limit or upper limit, the inequality sign (<) may be replaced with the inequality sign with equal sign (≤) in Conditional Expression (1). In principle, this applies to other expressions similarly. In other conditional expressions, the inequality sign with equal sign (≤) may be replaced with the inequality sign (<).

1-2-2. Conditional Expression (2)

$$0.50 < Fb/F < 2.50 \quad (2)$$

where

Fb is a focal length on the d line of the lens subgroup B,
F is a focal length on the d line of the optical system.

Conditional Expression (2) described above is an expression that defines the ratio of the focal length of the lens subgroup B to the focal length of the optical system. Satisfying Conditional Expression (2) makes it possible to well correct chromatic aberration in the entire range from the visible light range to the near-infrared range, and to well correct various aberrations such as field curvature and astigmatism, therefore making it easier to obtain an optical system with high imaging performance.

In contrast, when this numerical value becomes equal to or less than the lower limit, the refractive power of the lens subgroup B becomes strong, making it difficult to well correct chromatic aberration, field curvature, and astigmatism in the entire range from the visible light range to the near-infrared range, and to obtain an optical system with high imaging performance. Meanwhile, when this numerical value becomes equal to or greater than the upper limit, the refractive power of the lens subgroup B becomes weak, making it difficult to increase the aperture and decrease the size.

In order to obtain the above-described effect, as the lower limit of Conditional Expression (2), 0.60 is more preferable, and 0.70 is further preferable. As the upper limit of Conditional Expression (2), 2.00 is more preferable, and 1.50 is further preferable.

1-2-3. Conditional Expression (3)

It is preferable that the negative lens disposed on the most object side in the lens subgroup B satisfies the following conditional expression.

$$-0.007 < 0.00558 \times vd\_n + 0.531 - \theta ct\_n < 0.000 \quad (3)$$

where vd_n is an Abbe number on the d line of the negative lens disposed on the most object side in the lens subgroup B.

θct_n is a partial dispersion ratio regarding the C line and the t line of the negative lens disposed on the most object side in the lens subgroup B.

Note that it is assumed that the partial dispersion ratio θct from the C line to the t line is defined by the following expression.

$$\theta ct = (nC - nt)/(nF - nC)$$

nC is a refractive index on the C line, and the C line refers to light with a wavelength of 656.2800 nm.

nt is a refractive index on the t line, and the t line refers to light with a wavelength of 1013.9800 nm.

Conditional Expression (3) described above is an expression that defines a glass material of the negative lens disposed on the most object side in the lens subgroup B. By using a lens including a glass material that satisfies Conditional Expression (3) for the negative lens disposed on the most object side in the lens subgroup B, it becomes easier to well correct chromatic aberration from the visible light range to the near infrared light range. By using such a glass material for the negative lens disposed just in the back of the aperture stop, it is possible to correct chromatic aberration more effectively than using the glass material for other lenses.

In order to obtain the above-described effect, as the lower limit of Conditional Expression (3), −0.006 is preferable, and −0.005 is more preferable.

1-2-4. Conditional Expression (4)

It is preferable that the positive lens disposed on the most object side in the lens subgroup A satisfies the following conditional expression.

$$0.623 < \theta gF\_p \quad (4)$$

where

θgF_p is a partial dispersion ratio regarding the g line and the F line of the positive lens.

Note that it is assumed that the partial dispersion ratio θgF from the g line to the F line is defined by the following expression.

$$\theta gF = (ng - nF)/(nF - nC)$$

ng is a refractive index on the g line, and the g line refers to light with a wavelength of 435.8400 nm.

Conditional Expression (4) described above is an expression that defines the glass material of the positive lens disposed on the most object side in the lens subgroup A. By using the lens including the glass material that satisfies Conditional Expression (4) for the positive lens disposed on the most object side in the lens subgroup A, it is possible to well correct the chromatic aberration in the light having a wavelength in the visible light range, particularly in the light having a wavelength on the short wavelength side.

In order to obtain the above-described effect, as the lower limit of Conditional Expression (4), 0.625 is preferable, and 0.627 is more preferable.

1-2-5. Conditional Expression (5) and Conditional Expression (6)

It is preferable that the positive lens disposed in the lens subgroup B satisfies the following conditional expressions.

$$nd\_pave < 1.75 \quad (5)$$

$$vd\_pave > 50 \quad (6)$$

where nd_pave is an average value of the refractive indices on the d-line of all positive lenses disposed in the lens subgroup B.

vd_pave is an average value of the Abbe numbers on the d-line of all positive lenses disposed in the lens subgroup B.

Conditional Expression (5) is an expression that defines the average value of the Abbe numbers on the d-line of the positive lens included in the lens subgroup B. Conditional Expression (6) is an expression that defines the average value of the refractive indices on the d-line of the positive lens included in the lens subgroup B. Disposing the positive lens including the glass material that satisfies both Conditional Expression (5) and Conditional Expression (6) in the lens subgroup B makes it possible to prevent the dispersion caused by the positive lens from becoming too large in the lens subgroup B, and to well correct chromatic aberration from the visible light range to the near-infrared light range.

When the numerical value of Conditional Expression (5) is equal to or less than the lower limit, the dispersion of the positive lens included in the lens subgroup B becomes large, and it becomes difficult to correct the near-infrared chromatic aberration for visible light. When the numerical value of Conditional Expression (6) becomes equal to or greater than the upper limit, it becomes difficult to correct field curvature and astigmatism.

In order to obtain the above-described effect, as the upper limit of Conditional Expression (5), 1.74 is more preferable. As the lower limit of Conditional Expression (6), 52 is more preferable.

1-2-6. Conditional Expression (7) and Conditional Expression (8)

It is preferable that the lens subgroup B includes at least one negative lens that satisfies the following conditional expressions.

$$\theta ct \geq 0.800 \quad (7)$$

$$vd \leq 55 \quad (8)$$

Conditional Expression (7) is an expression that defines dispersibility from the C line to the t line of the glass material. Conditional Expression (8) is an expression that defines the Abbe number on the d line of the glass material. The configuration in which the lens subgroup B includes at least one negative lens including the glass material satisfying Conditional Expression (7) and Conditional Expression (8) makes it possible to well correct chromatic aberration from the visible light range to the near-infrared range.

In order to obtain the above-described effect, as the lower limit of Conditional Expression (7), 0.810 is more preferable, and 0.815 is further preferable. As the upper limit of Conditional Expression (8), 53 is more preferable.

1-2-7. Conditional Expression (9)

$$1.50 < Fa/F < 6.00 \quad (9)$$

where

Fa is a focal length on the d line of the lens subgroup A.

Conditional Expression (9) described above is an expression that defines the ratio of the focal length on the d line of the lens subgroup A to the focal length of the optical system. Satisfying Conditional Expression (9) makes it possible to well correct various aberrations such as spherical aberration and chromatic aberration, and makes it easier to implement an optical system with high imaging performance in a wide wavelength range from the visible light range to the near-infrared range.

In contrast, when this numerical value is equal to or less than the lower limit, the refractive power of the lens subgroup A becomes strong, various aberrations, mainly field curvature and distortion, are corrected excessively, making it difficult to obtain an optical system with high imaging performance in the entire range from the visible light range to the near-infrared range. Meanwhile, when this numerical value is equal to or greater than the upper limit, the refractive power of the lens subgroup A becomes weak, making it difficult to well correct field curvature and distortion.

In order to obtain the above-described effect, as the lower limit of Conditional Expression (9), 1.75 is preferable, and 2.00 is more preferable. As the upper limit of Conditional Expression (9), 5.80 is preferable, and 5.70 is more preferable.

2. Imaging Device

Next, the imaging device according to the present invention will be described. The imaging device according to the present invention includes the optical system according to the present invention and an image sensor that converts an optical image formed by the optical system into an electrical signal. Note that it is preferable that the image sensor is provided on the image side of the optical system.

Here, the optical system according to the present invention has good imaging performance in a wide wavelength range from the visible light range to the near-infrared range. Therefore, as the image sensor, a short wave infrared (SWIR) sensor having sensitivity to light beams of a near-infrared range wavelength and other sensors as well as an image sensor for a visible light range having sensitivity to light beams having a wavelength of visible light range such as a charge coupled device (CCD) sensor, a complementary metal oxide semiconductor (CMOS) sensor, and other sensors can be suitably used. In particular, if the image sensor having sensitivity to light beams in the entire wavelength range from the visible light range to the near-infrared range (for example, 400 nm to 1700 nm) and the optical system according to the present invention are used, without using two imaging devices as in the past, that is, an imaging device for visible light and an imaging device for near-infrared light, it is possible to implement an industrial camera that can sense not only external structure of an object but also the inside of the object and the like by using light beams from the visible light range to the near-infrared range with one imaging device, which is more preferable. However, the imaging device according to the present invention can be applied not only to industrial cameras used for applications such as material selection, foreign matter inspection, and semiconductor inspection, but also to imaging devices for various applications such as surveillance cameras, vehicle-mounted cameras, and drone-mounted cameras.

Figure 11:
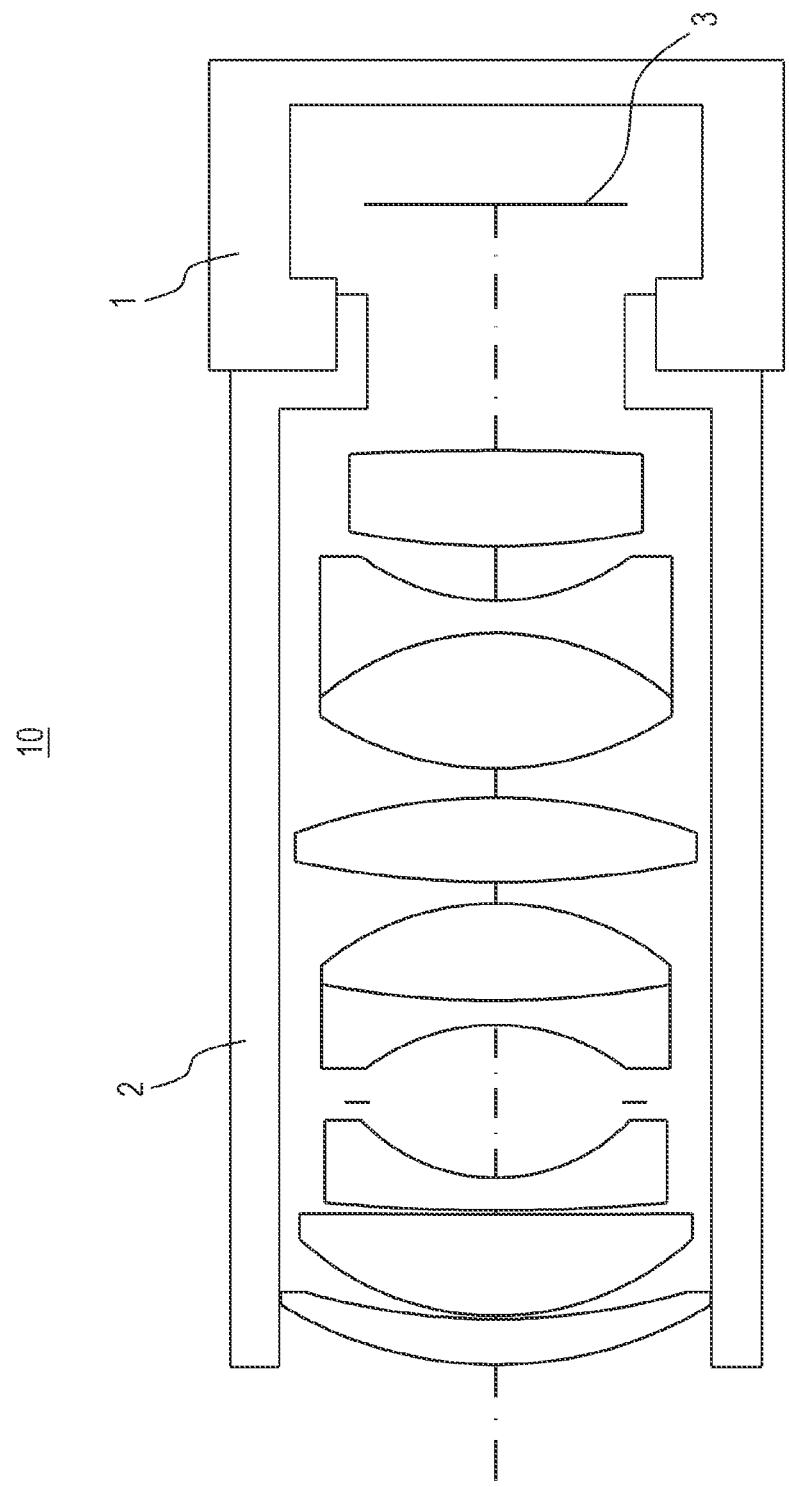
FIG. 11 is a view schematically showing one example of a configuration of an imaging device according to one embodiment of the present invention.

FIG. 11 is a view schematically showing one example of the configuration of the imaging device 10. The imaging device 10 includes an imaging device body 1, a lens barrel 2 that can be attached to and detached from the imaging device body 1, and an image sensor 3 disposed on the image side of the optical system. The optical system according to the present invention, a drive mechanism for driving lens groups during focusing, and the like are housed in the lens barrel 2.

Next, the present invention will be specifically described with reference to the embodiments. However, the present invention is not limited to the following embodiments.

First Embodiment (1) Optical Configuration

FIG. 1 is a cross-sectional view of an optical system of the first embodiment according to the present invention when focusing at infinity. The optical system includes a focus lens group F having positive refractive power and configured to move along an optical axis when focusing from an infinite-distance object to a short-distance object. The focus lens group F includes a lens subgroup A Ga, an aperture stop S, and a lens subgroup B Gb in order from the object side. The optical system focuses from an infinite-distance object to a short-distance object by moving the entire focus lens group F along the optical axis to the object side. The configurations of the lens subgroup A Ga and the lens subgroup B Gb will be described below.

The lens subgroup A Ga includes a positive meniscus lens L1 having an object side convex shape, a positive meniscus lens L2 having an object side convex shape, and a negative meniscus lens L3 having an object side convex shape, in order from the object side. The lens subgroup A Ga has positive refractive power as a whole.

The lens subgroup B Gb includes a cemented lens in which a biconcave lens L4 and a biconvex lens L5 are cemented, a biconvex lens L6, a cemented lens in which a biconvex lens L7 and a biconcave lens L8 are cemented, and a biconvex lens L9. The lens subgroup B Gb has positive refractive power as a whole.

Note that in FIG. 1, "I" is an image plane, and specifically indicates an image plane of an image sensor such as an SWIR sensor, a CCD sensor, or a CMOS sensor, a film surface of a silver halide film, or the like. It is preferable that the SWIR sensor is a sensor having sensitivity to light having a wavelength from the visible light range to the near infrared wavelength range. Since this is similar in each lens cross-sectional view shown in other embodiments, the description thereof will be omitted below.

(2) Numerical Example

Next, numerical examples to which specific numerical values of the optical system are applied will be described. "Lens data", "specification table", and "lens group data" are shown below. Values of respective expressions (Table 1) are shown together after the fifth embodiment.

In (lens data), "surface NO." indicates the order of the lens surface counted from the object side, "r" indicates the radius of curvature of the lens surface, "d" indicates the lens wall thickness or air space on the optical axis, "Nd" indicates the refractive index on the d line (wavelength λ=587.5618 nm), "vd" indicates the Abbe number on the d line, "θgF" indicates the partial dispersion ratio ((ng−nF)/(nF−nC)) from the g line to the F line, "θCT" indicates the partial dispersion ratio ((nC−nt)/(nF−nC)) from the C line to the t line, and "θIR" indicates the value of "(nFnd)/(n1700 nm−nd)". In the column of "d", "D (17)" means that the space on the optical axis of the lens surface is a variable space that changes when focusing. "INF" in the column of radius of curvature means infinity, and means that the surface is a plane.

In the (specification table), "F" is a focal length of the optical system, "Fno" is an F value, "ω" is a half angle of view, and "D (17)" is the above variable space. The table shows values when focusing an infinite-distance object (INF) and when focusing a short-distance object.

(Lens group data) indicates focal lengths of respective groups that constitute the optical system (lens subgroup A Ga and lens subgroup B Gb in the first embodiment).

Since items in each of these tables are similar in each table shown in other embodiments, the description thereof will be omitted below.

Figure 2:
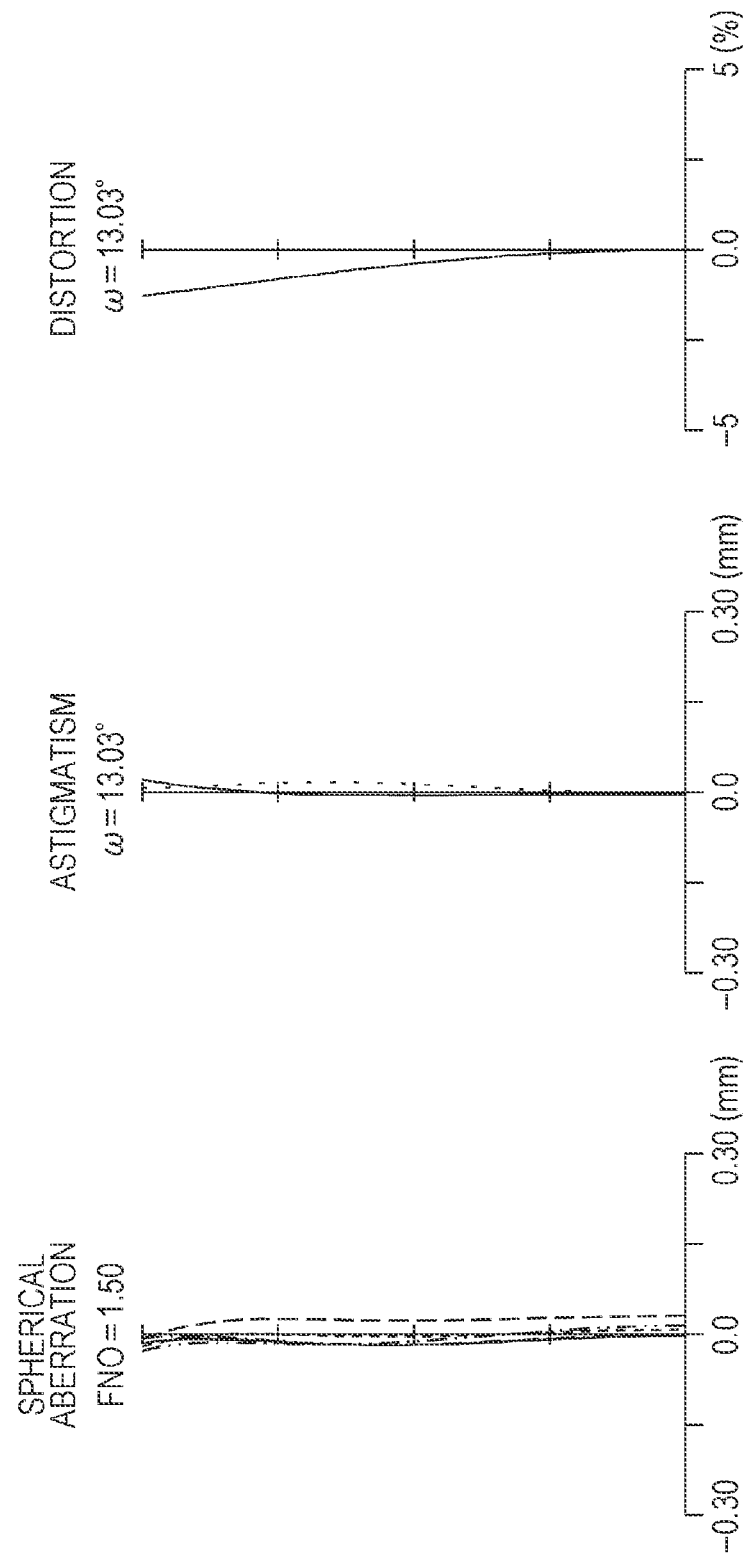
FIG. 2 is an aberration diagram of the optical system according to the first embodiment.

FIG. 2 shows a longitudinal aberration diagram of the optical system when focusing at infinity. The longitudinal aberration diagram shown in each figure is spherical aberration (mm), astigmatism (mm), and distortion (%) in order from the left side when facing the drawing. In the spherical aberration diagram, the dash-dot-dot line indicates the spherical aberration on the light with a wavelength of 1700 nm, the dash-dot line indicates the spherical aberration on the C line (656.2800 nm), the solid line indicates the spherical aberration on the d line (wavelength 587.5618 nm), the short dashed line indicates the spherical aberration on the F line (wavelength 486.1300 nm), and the long dashed line indicates the spherical aberration on the g line (wavelength 435.8400 nm). In the astigmatism diagram, the vertical axis is half angle of view (ω), the horizontal axis is defocus, the solid line indicates a sagittal image plane of the d line, and the broken line indicates a meridional image plane of the d line. In the distortion diagram, the vertical axis is half angle of view (ω) and the horizontal axis is distortion. Since these items are similar in each aberration diagram shown in other embodiments, the description thereof will be omitted below.

(Lens data)

| Surface NO. | r | d | Nd | vd | θgF | θCT | θIR |
|---|---|---|---|---|---|---|---|
| 1 | 25.641 | 2.820 | 1.8081 | 22.76 | 0.63 | 0.66 | −0.51 |
| 2 | 42.407 | 0.200 | | | | | |
| 3 | 17.806 | 6.270 | 1.4970 | 81.54 | 0.54 | 0.83 | −0.35 |
| 4 | 1633.777 | 0.243 | | | | | |
| 5 | 119.959 | 2.000 | 1.6134 | 44.27 | 0.56 | 0.78 | −0.37 |
| 6 | 11.434 | 4.660 | | | | | |
| 7 (Stop) | INF | 4.780 | | | | | |
| 8 | −13.365 | 1.500 | 1.8548 | 24.80 | 0.61 | 0.67 | −0.49 |
| 9 | 58.530 | 6.000 | 1.4970 | 81.54 | 0.54 | 0.83 | −0.35 |
| 10 | −17.008 | 1.329 | | | | | |
| 11 | 61.353 | 5.200 | 1.9053 | 35.04 | 0.58 | 0.71 | −0.46 |
| 12 | −36.177 | 1.797 | | | | | |
| 13 | 19.740 | 8.350 | 1.4970 | 81.54 | 0.54 | 0.83 | −0.35 |
| 14 | −16.759 | 2.000 | 1.5174 | 52.20 | 0.56 | 0.82 | −0.35 |
| 15 | 14.063 | 3.396 | | | | | |
| 16 | 47.525 | 5.330 | 1.7620 | 40.10 | 0.58 | 0.74 | −0.43 |
| 17 | −195.809 | D (17) | | | | | |

(Specification table)

| | INF | 0.5 m |
|---|---|---|
| F | 35.00 | — |
| Fno | 1.50 | — |
| ω | 13.03 | — |
| D (17) | 15.164 | 17.543 |

(Lens group data)

| | |
|---|---|
| Fa | 197.146 |
| Fb | 25.675 |

Second Embodiment (1) Optical Configuration

Figure 3:
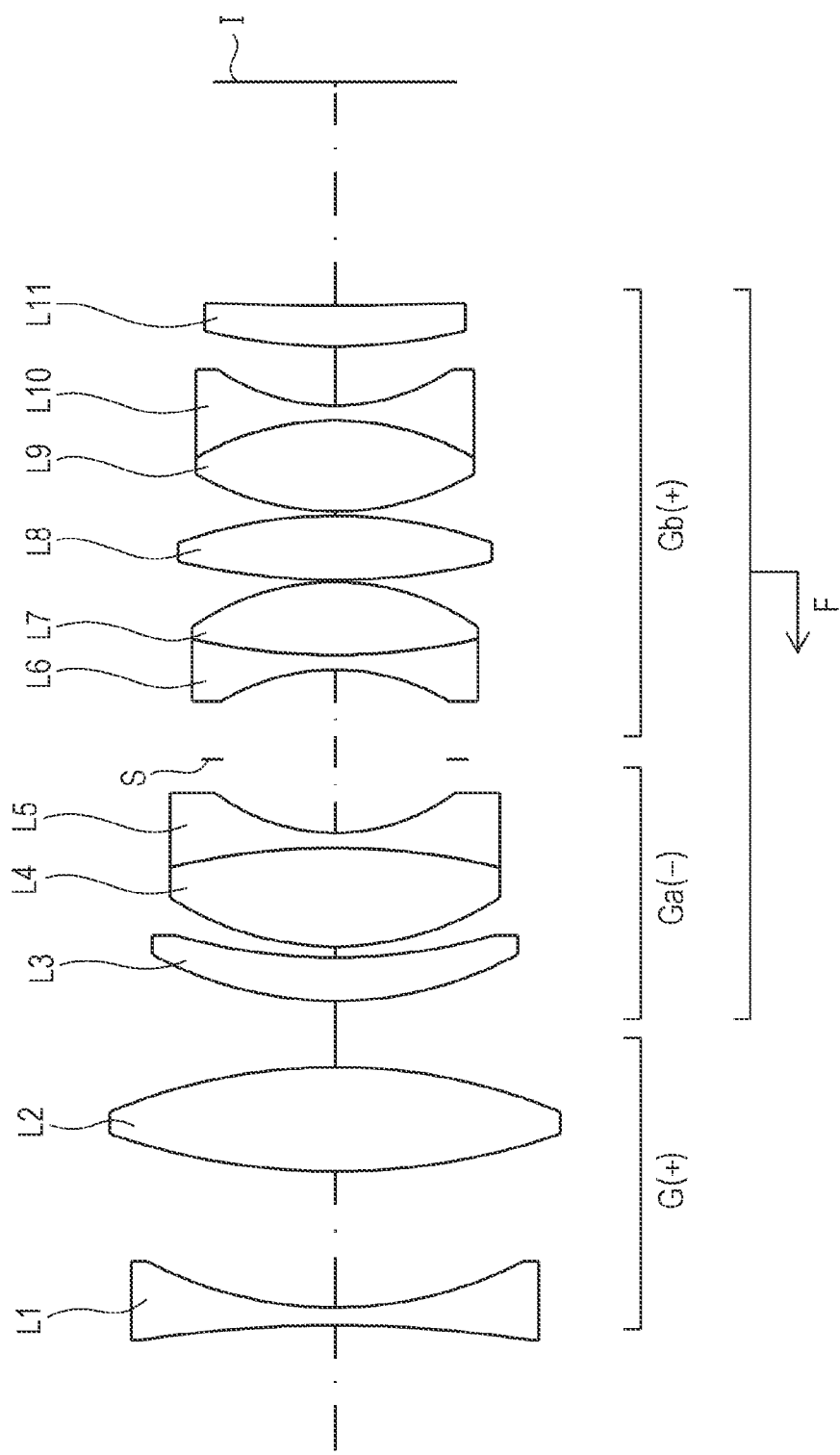
FIG. 3 is a cross-sectional view of an optical system according to a second embodiment.

FIG. 3 is a cross-sectional view of an optical system of the second embodiment according to the present invention when focusing at infinity. The optical system includes a focus lens group F having positive refractive power and configured to move along an optical axis when focusing from an infinite-distance object to a short-distance object. The focus lens group F includes a lens subgroup A Ga, an aperture stop S, and a lens subgroup B Gb in order from the object side. The optical system focuses from an infinite-distance object to a short-distance object by moving the entire focus lens group F along the optical axis to the object side. The optical system includes a fixed lens group G fixed in the optical axis direction when focusing, on the object side of the focus lens group F. The configurations of the fixed lens group G, the lens subgroup A Ga, and the lens subgroup B Gb will be described below.

The fixed lens group G includes a biconcave lens L1 and a biconvex lens L2 in order from the object side, and has positive refractive power as a whole.

The lens subgroup A Ga includes a positive meniscus lens L3 having an object side convex shape and a cemented lens in which a biconvex lens L4 and a biconcave lens L5 are cemented, in order from the object side. The lens subgroup A Ga has negative refractive power as a whole.

The lens subgroup B Gb includes a cemented lens in which a biconcave lens L6 and a biconvex lens L7 are cemented, a biconvex lens L8, a cemented lens in which a biconvex lens L9 and a biconcave lens L10 are cemented, and a positive meniscus lens L11 having an object side convex shape. The lens subgroup B Gb has positive refractive power as a whole.

(2) Numerical Example

Figure 4:
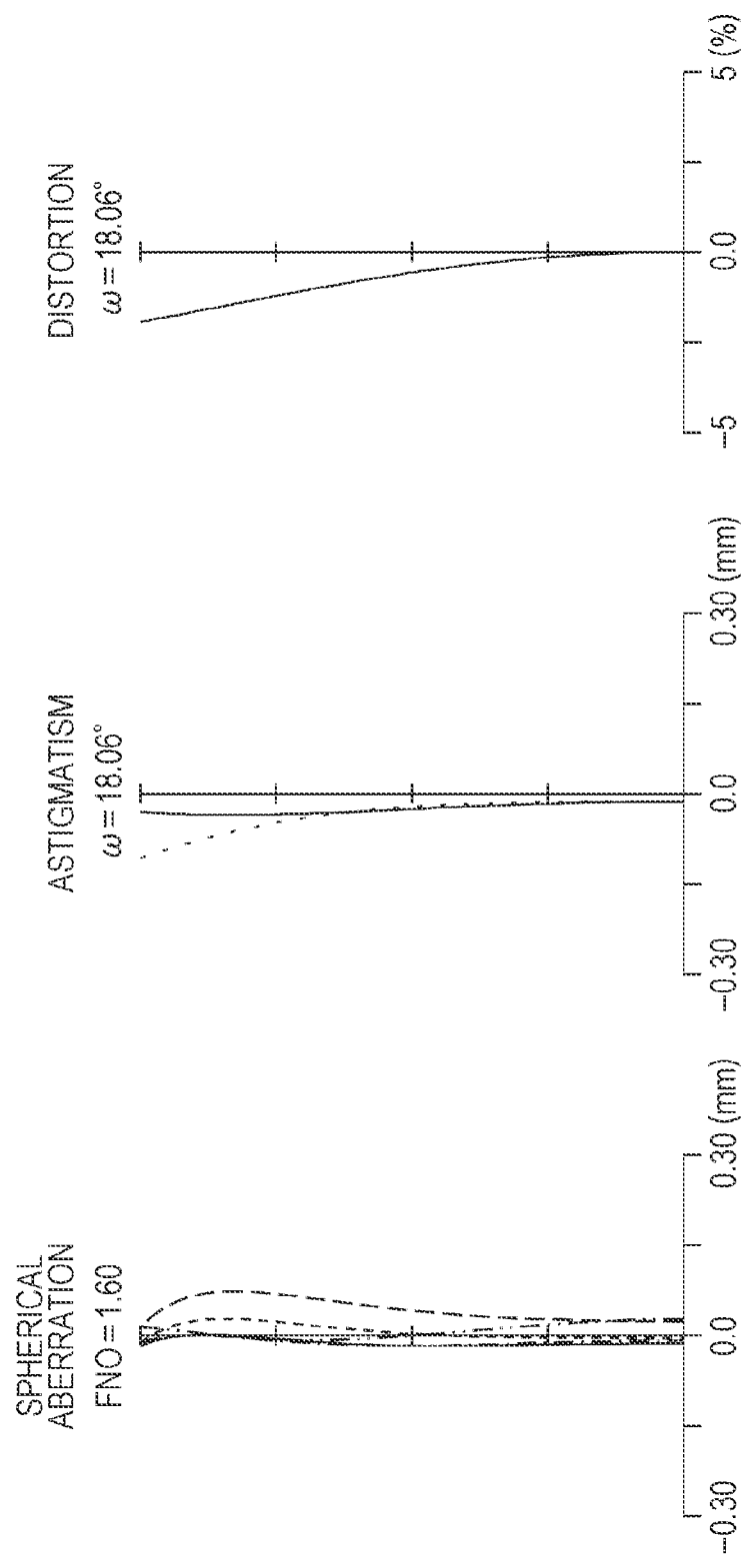
FIG. 4 is an aberration diagram of the optical system according to the second embodiment.

Next, "lens data", "specification table", and "lens group data" are shown as numerical examples to which specific numerical values of the optical system are applied. FIG. 4 shows a longitudinal aberration diagram of the optical system when focusing at infinity.

(Lens data)

| Surface NO. | r | d | Nd | vd | θgF | θCT | θIR |
|---|---|---|---|---|---|---|---|
| 1 | −87.554 | 1.200 | 1.8010 | 34.97 | 0.59 | 0.73 | −0.43 |
| 2 | 2.7045 | 9.108 | | | | | |
| 3 | 46.478 | 6.975 | 1.7200 | 46.02 | 0.56 | 0.76 | −0.40 |
| 4 | −39.323 | D (4) | | | | | |
| 5 | 25.549 | 2.901 | 1.8590 | 22.73 | 0.63 | 0.66 | −0.51 |
| 6 | 39.096 | 0.732 | | | | | |
| 7 | 20.221 | 6.593 | 1.4970 | 81.54 | 0.54 | 0.83 | −0.35 |
| 8 | −46.742 | 1.000 | 1.6134 | 44.27 | 0.56 | 0.73 | −0.37 |
| 9 | 13.281 | 4.920 | | | | | |
| 10 (Stop) | INF | 5.989 | | | | | |
| 11 | −14.797 | 1.000 | 1.8548 | 24.80 | 0.61 | 0.67 | −0.49 |
| 12 | 43.598 | 4.863 | 1.4970 | 81.54 | 0.54 | 0.83 | −0.35 |
| 13 | −16.653 | 0.150 | | | | | |
| 14 | 45.138 | 4.288 | 1.9053 | 35.04 | 0.58 | 0.71 | −0.46 |
| 15 | −31.266 | 0.300 | | | | | |
| 16 | 18.547 | 6.064 | 1.4388 | 94.94 | 0.53 | 0.84 | −0.34 |
| 17 | −18.547 | 1.000 | 1.5174 | 52.20 | 0.56 | 0.82 | −0.35 |
| 18 | 13.996 | 3.957 | | | | | |
| 19 | 36.605 | 2.743 | 1.7440 | 44.79 | 0.57 | 0.75 | −0.41 |
| 20 | 235.499 | D (20) | | | | | |

(Specification table)

| | INF | 0.2 m |
|---|---|---|
| F | 25.01 | — |
| Fno | 1.60 | — |
| ω | 18.06 | — |
| D (4) | 4.430 | 1.463 |
| D (20) | 14.814 | 17.781 |

(Lens group data)

| | |
|---|---|
| FG | 119.386 |
| Fa | −871.357 |
| Fb | 35.250 |

However, in the above data, FG is a focal length of the fixed lens group G. The same applies to the following embodiments.

Third Embodiment (1) Optical Configuration

Figure 5:
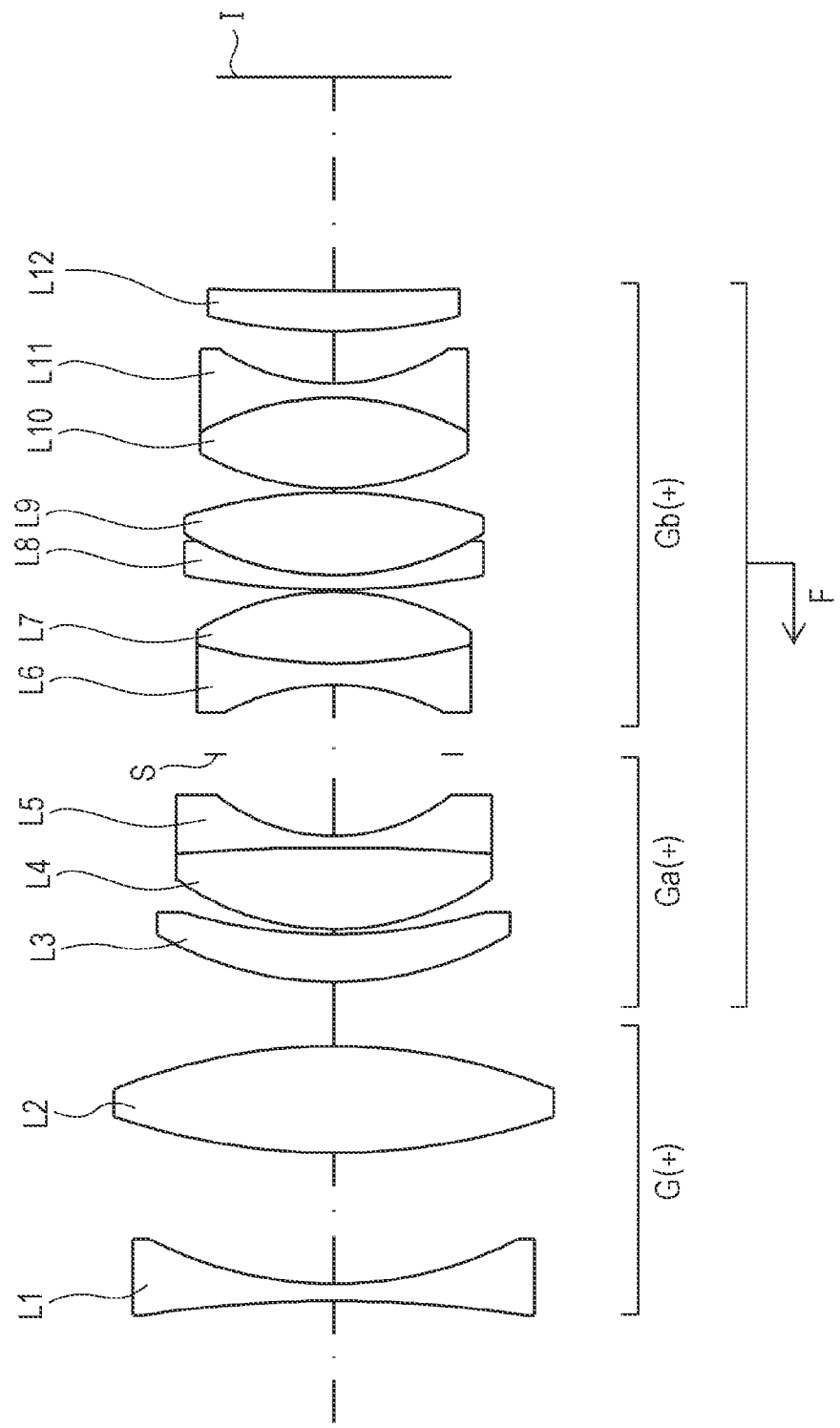
FIG. 5 is a cross-sectional view of an optical system according to a third embodiment.

FIG. 5 is a cross-sectional view of an optical system of the third embodiment according to the present invention when focusing at infinity. The optical system includes a focus lens group F having positive refractive power and configured to move along an optical axis when focusing from an infinite-distance object to a short-distance object. The focus lens group F includes a lens subgroup A Ga, an aperture stop S, and a lens subgroup B Gb in order from the object side. The optical system focuses from an infinite-distance object to a short-distance object by moving the entire focus lens group F along the optical axis to the object side. The optical system includes a fixed lens group G fixed in the optical axis direction when focusing, on the object side of the focus lens group F. The configurations of the fixed lens group G, the lens subgroup A Ga, and the lens subgroup B Gb will be described below.

The fixed lens group G includes a biconcave lens L1 and a biconvex lens L2 in order from the object side, and has positive refractive power as a whole.

The lens subgroup A Ga includes a positive meniscus lens L3 having an object side convex shape and a cemented lens in which a biconvex lens L4 and a biconcave lens L5 are cemented, in order from the object side. The lens subgroup A Ga has positive refractive power as a whole.

The lens subgroup B Gb includes a cemented lens in which a biconcave lens L6 and a biconvex lens L7 are cemented, a cemented lens in which a negative meniscus lens L8 having an object side convex shape and a biconvex lens L9 are cemented, a cemented lens in which a biconvex lens L10 and a biconcave lens L11 are cemented, and a positive meniscus lens L12 having an object side convex shape. The lens subgroup B Gb has positive refractive power as a whole.

(2) Numerical Example

Figure 6:
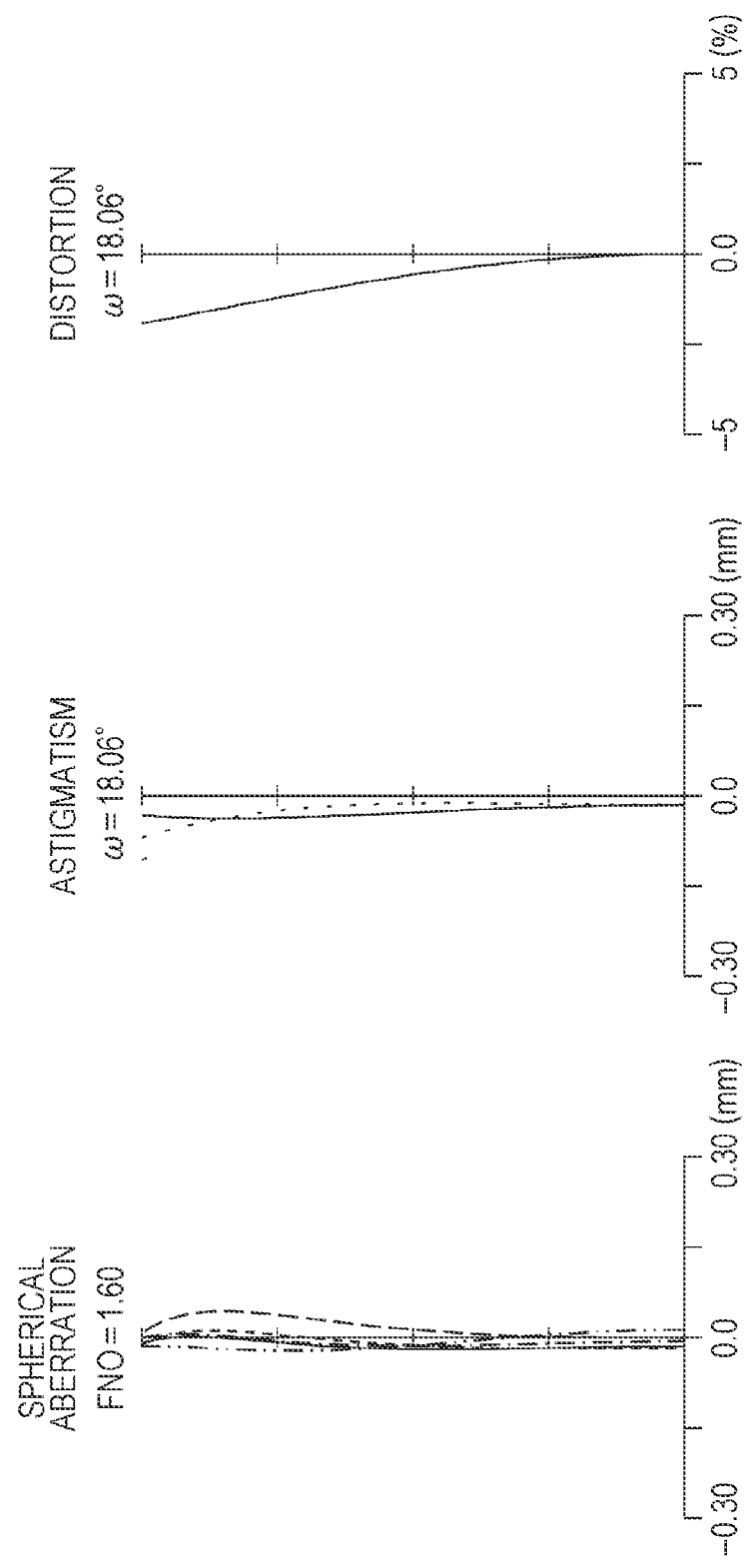
FIG. 6 is an aberration diagram of the optical system according to the third embodiment.

Next, "lens data", "specification table", and "lens group data" are shown as numerical examples to which specific numerical values of the optical system are applied. FIG. 6 shows a longitudinal aberration diagram of the optical system when focusing at infinity.

(Lens data)

| Surface NO. | r | d | Nd | vd | θgF | θCT | θIR |
|---|---|---|---|---|---|---|---|
| 1 | −90.774 | 1.200 | 1.8010 | 34.97 | 0.59 | 0.73 | −0.43 |
| 2 | 27.804 | 9.091 | | | | | |
| 3 | 47.504 | 7.394 | 1.7200 | 46.02 | 0.56 | 0.76 | −0.40 |
| 4 | −40.398 | D (4) | | | | | |
| 5 | 24.335 | 3.315 | 1.8590 | 22.73 | 0.63 | 0.66 | −0.51 |
| 6 | 37.040 | 0.351 | | | | | |
| 7 | 18.942 | 5.655 | 1.4970 | 81.54 | 0.54 | 0.83 | −0.35 |
| 8 | −136.703 | 0.800 | 1.6134 | 44.27 | 0.56 | 0.78 | −0.37 |
| 9 | 13.033 | 5.655 | | | | | |
| 10 (Stop) | INF | 4.832 | | | | | |
| 11 | −15.908 | 1.500 | 1.8548 | 24.80 | 0.61 | 0.67 | −0.49 |
| 12 | 35.459 | 4.954 | 1.4970 | 81.54 | 0.54 | 0.83 | −0.35 |
| 13 | −18.095 | 0.150 | | | | | |
| 14 | 55.112 | 1.000 | 1.8010 | 34.97 | 0.59 | 0.73 | −0.43 |
| 15 | 19.996 | 5.734 | 1.9053 | 35.04 | 0.58 | 0.71 | −0.46 |
| 16 | −33.259 | 0.300 | | | | | |
| 17 | 19.042 | 6.271 | 1.4388 | 94.94 | 0.53 | 0.84 | −0.34 |
| 18 | −19.042 | 1.000 | 1.5174 | 52.20 | 0.56 | 0.82 | −0.35 |
| 19 | 14.490 | 3.615 | | | | | |
| 20 | 36.504 | 2.785 | 1.7440 | 44.79 | 0.57 | 0.75 | −0.41 |
| 21 | 325.761 | D (21) | | | | | |

(Specification table)

| | INF | 0.2 m |
|---|---|---|
| F | 25.00 | — |
| Fne | 1.60 | — |
| ω | 18.04 | — |
| D (4) | 4.449 | 1.500 |
| D (21) | 14.820 | 17.772 |

(Lens group data)

| | |
|---|---|
| FG | 124.472 |
| Fa | 898.345 |
| Fb | 27.139 |

Fourth Embodiment (1) Optical Configuration

Figure 7:
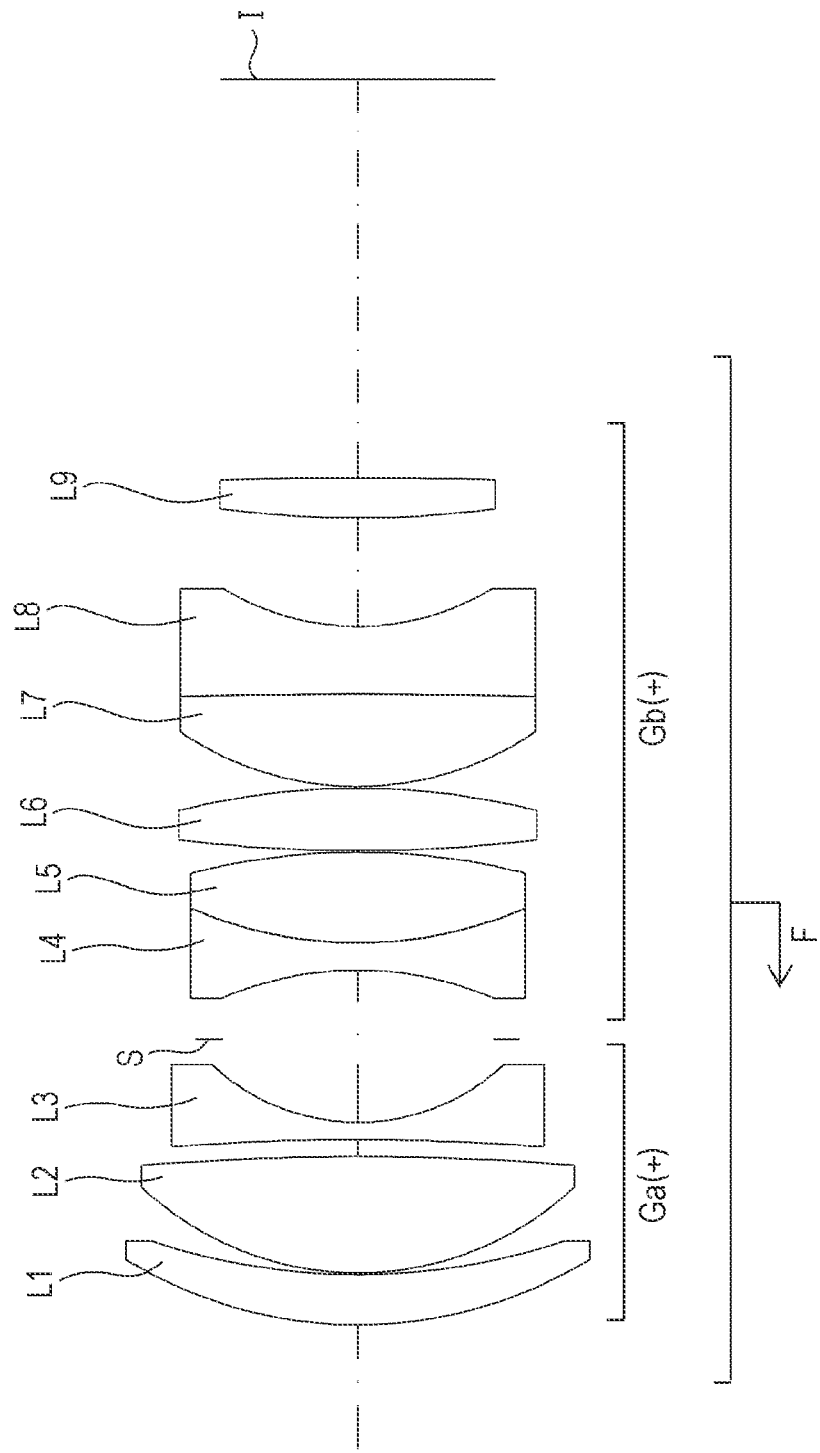
FIG. 7 is a cross-sectional view of an optical system according to a fourth embodiment.

FIG. 7 is a cross-sectional view of an optical system of the fourth embodiment according to the present invention when focusing at infinity. The optical system includes a focus lens group F having positive refractive power and configured to move along an optical axis when focusing from an infinite-distance object to a short-distance object. The focus lens group F includes a lens subgroup A Ga, an aperture stop S, and a lens subgroup B Gb in order from the object side. The optical system focuses from an infinite-distance object to a short-distance object by moving the entire focus lens group F along the optical axis to the object side. The configurations of the lens subgroup A Ga and the lens subgroup B Gb will be described below.

The lens subgroup A Ga includes a positive meniscus lens L1 having an object side convex shape, a biconvex lens L2, and a biconcave lens L3 in order from the object side, and has positive refractive power as a whole.

The lens subgroup B Gb includes a cemented lens in which a biconcave lens L4 and a biconvex lens L5 are cemented, a biconvex lens L6, a cemented lens in which a biconvex lens L7 and a biconcave lens L8 are cemented, and a biconvex lens L9. The lens subgroup B Gb has positive refractive power as a whole.

(2) Numerical Example

Figure 8:
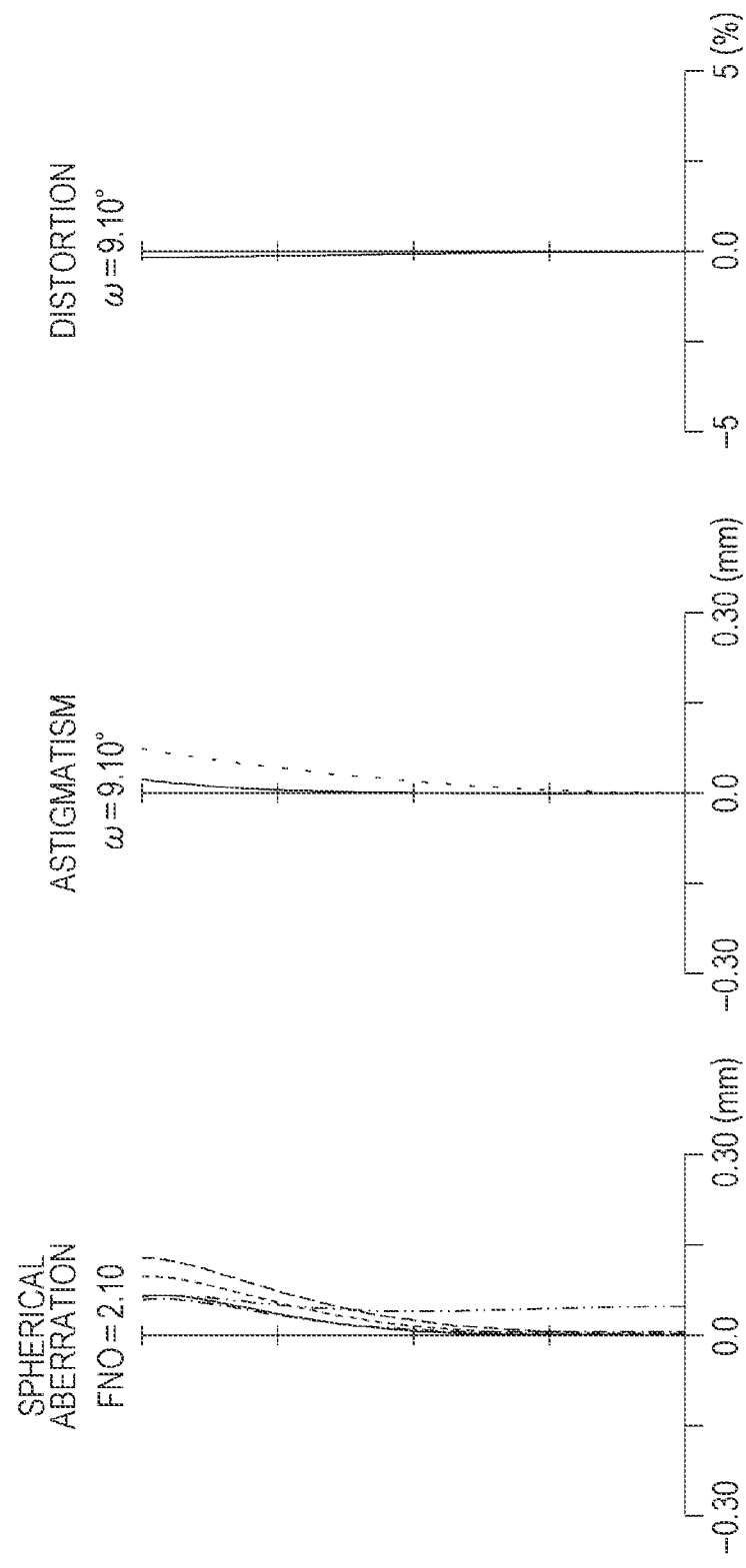
FIG. 8 is an aberration diagram of the optical system according to the fourth embodiment.

Next, "lens data", "specification table", and "lens group data" are shown as numerical examples to which specific numerical values of the optical system are applied. FIG. 8 shows a longitudinal aberration diagram of the optical system when focusing at infinity.

(Lens data)

| Surface NO. | r | d | Nd | vd | θgF | θCT | θIR |
|---|---|---|---|---|---|---|---|
| 1 | 25.968 | 2.938 | 1.8081 | 27.76 | 0.63 | 0.66 | −0.51 |
| 2 | 38.031 | 0.100 | | | | | |
| 3 | 18.456 | 6.800 | 1.5503 | 75.50 | 0.54 | 0.81 | −0.36 |
| 4 | −160.456 | 0.997 | | | | | |
| 5 | −137.028 | 1.012 | 1.5174 | 52.15 | 0.56 | 0.80 | −0.36 |
| 6 | 12.474 | 4.895 | | | | | |
| 7 (Stop) | INF | 4.000 | | | | | |
| 8 | −20.053 | 1.612 | 1.8548 | 24.80 | 0.61 | 0.67 | −0.49 |
| 9 | 24.745 | 5.303 | 1.5503 | 75.50 | 0.54 | 0.81 | −0.36 |
| 10 | −39.489 | 0.100 | | | | | |
| 11 | 91.863 | 3.638 | 1.8810 | 40.14 | 0.57 | 0.73 | −0.44 |
| 12 | −42.288 | 0.100 | | | | | |
| 13 | 18.442 | 5.408 | 1.5503 | 75.50 | 0.54 | 0.81 | −0.36 |
| 14 | −370.245 | 3.968 | 1.5174 | 52.20 | 0.56 | 0.82 | −0.35 |
| 15 | 15.088 | 6.342 | | | | | |
| 16 | 61.068 | 2.363 | 1.9459 | 17.98 | 0.65 | 0.63 | −0.53 |
| 17 | −250.020 | D (17) | | | | | |

(Specification table)

| | INF | 0.5 m |
|---|---|---|
| F | 50.00 | — |
| Fno | 2.10 | — |
| ω | 18.20 | — |
| D (17) | 73.290 | 28.427 |

(Lens group data)

| | |
|---|---|
| Fa | 102.833 |
| Fb | 44.605 |

Fifth Embodiment (1) Optical Configuration

Figure 9:
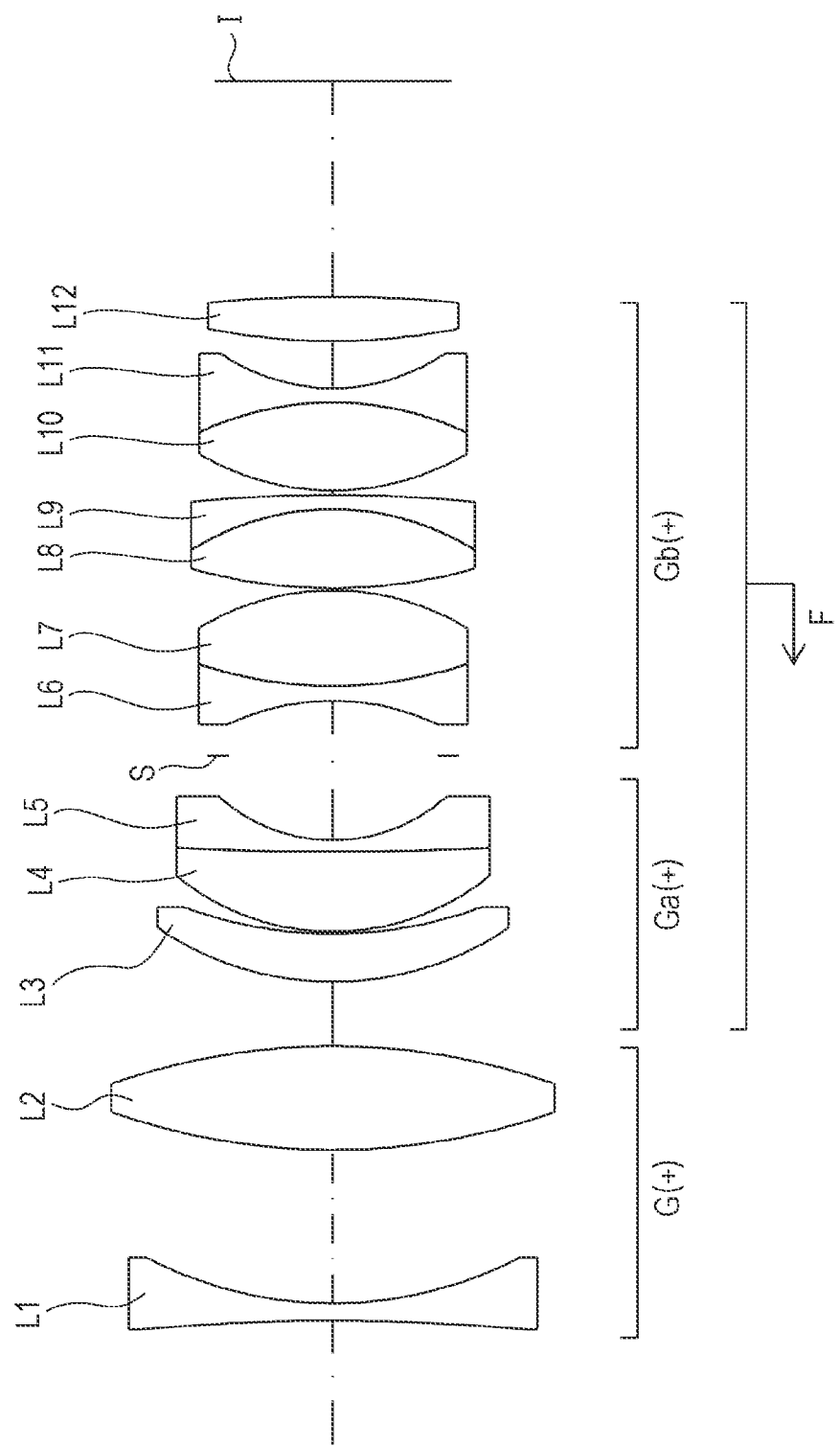
FIG. 9 is a cross-sectional view of an optical system according to a fifth embodiment.

FIG. 9 is a cross-sectional view of an optical system of the fifth embodiment according to the present invention when focusing at infinity. The optical system includes a focus lens group F having positive refractive power and configured to move along an optical axis when focusing from an infinite-distance object to a short-distance object. The focus lens group F includes a lens subgroup A Ga, an aperture stop S, and a lens subgroup B Gb in order from the object side. The optical system focuses from an infinite-distance object to a short-distance object by moving the entire focus lens group F along the optical axis to the object side. The optical system includes a fixed lens group G fixed in the optical axis direction when focusing, on the object side of the focus lens group F. The configurations of the fixed lens group G, the lens subgroup A Ga, and the lens subgroup B Gb will be described below.

The fixed lens group G includes a biconcave lens L1 and a biconvex lens L2 in order from the object side, and has positive refractive power as a whole.

The lens subgroup A Ga includes a positive meniscus lens L3 having an object side convex shape, and a cemented lens in which a positive meniscus lens L4 having an object side convex shape and a negative meniscus lens L5 having an object side convex shape are cemented, in order from the object side. The lens subgroup A Ga has positive refractive power as a whole.

The lens subgroup B Gb includes a cemented lens in which a biconcave lens L6 and a biconvex lens L7 are cemented, a cemented lens in which a biconvex lens L8 and a negative meniscus lens L9 having an object side concave shape are cemented, a cemented lens in which a biconvex lens L10 and a biconcave lens L11 are cemented, and a biconvex lens L12. The lens subgroup B Gb has positive refractive power as a whole.

(2) Numerical Example

Figure 10:
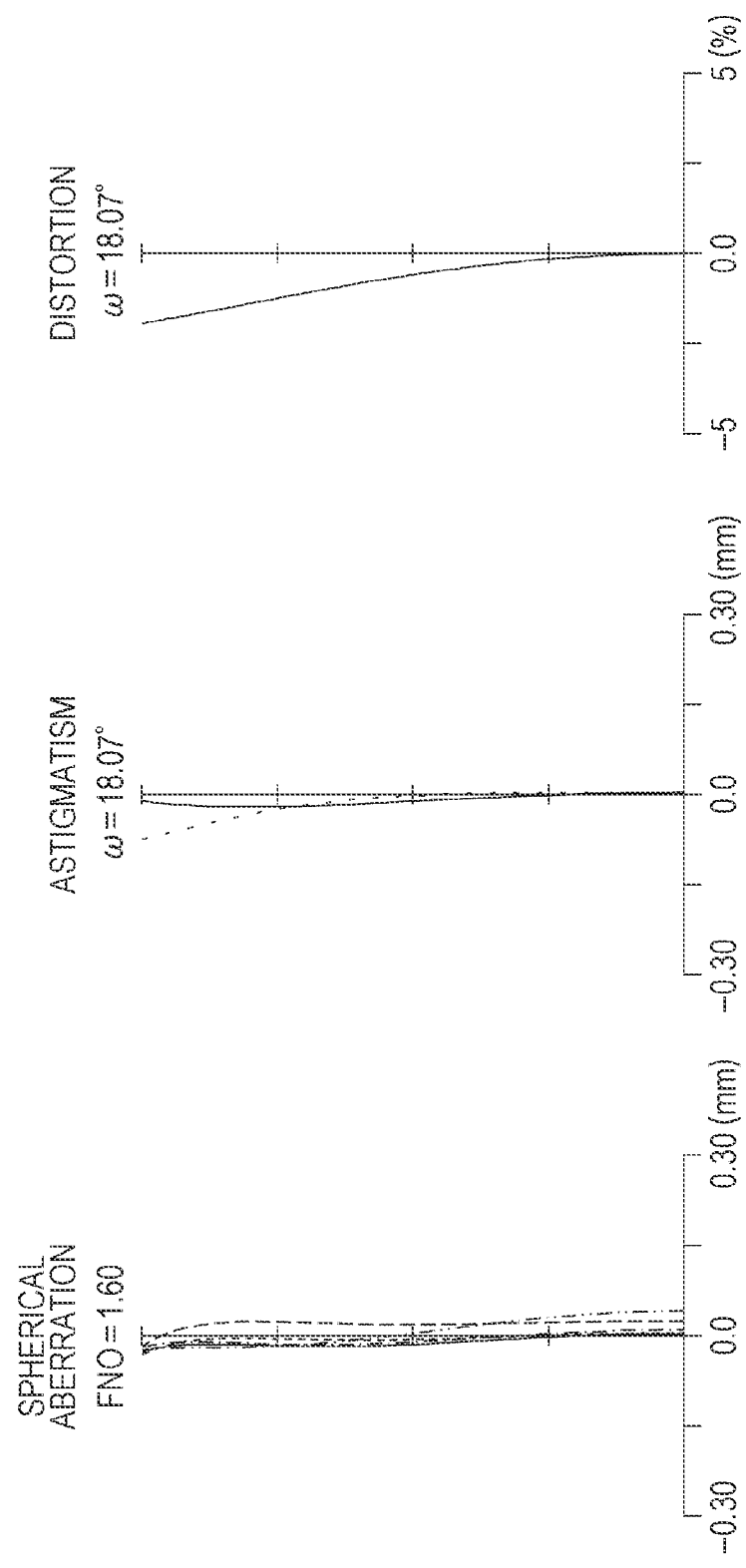
FIG. 10 is an aberration diagram of the optical system according to the fifth embodiment.

Next, "lens data", "specification table", and "lens group data" are shown as numerical examples to which specific numerical values of the optical system are applied. FIG. 10 shows a longitudinal aberration diagram of the optical system when focusing at infinity.

(Lens data)

| Surface NO. | r | d | Nd | vd | θgF | θCT | θIR |
|---|---|---|---|---|---|---|---|
| 1 | −143.559 | 1.200 | 1.8010 | 34.97 | 0.59 | 0.73 | −0.43 |
| 2 | 27.688 | 10.614 | | | | | |
| 3 | 46.009 | 7.165 | 1.7200 | 46.02 | 0.56 | 0.76 | −0.40 |
| 4 | −46.009 | D (4) | | | | | |
| 5 | 21.559 | 3.312 | 1.8590 | 22.73 | 0.63 | 0.66 | −0.51 |
| 6 | 29.383 | 0.150 | | | | | |
| 7 | 17.033 | 5.515 | 1.4970 | 81.54 | 0.54 | 0.83 | −0.35 |
| 8 | 210.405 | 0.800 | 1.6134 | 44.27 | 0.56 | 0.78 | −0.37 |
| 9 | 11.726 | 5.834 | | | | | |
| 10 (Stop) | INF | 3.803 | | | | | |
| 11 | −16.966 | 1.032 | 1.8548 | 24.80 | 0.61 | 0.67 | −0.49 |
| 12 | 28.979 | 6.610 | 1.4970 | 81.54 | 0.54 | 0.83 | −0.35 |
| 13 | −17.675 | 0.150 | | | | | |
| 14 | 36.036 | 5.457 | 1.9053 | 35.04 | 0.58 | 0.71 | −0.46 |
| 15 | −18.354 | 1.000 | 1.7495 | 35.33 | 0.58 | 0.73 | −0.43 |
| 16 | −96.721 | 0.300 | | | | | |
| 17 | 18.086 | 6.084 | 1.4388 | 94.94 | 0.53 | 0.84 | −0.34 |
| 18 | −21.483 | 1.000 | 1.5174 | 52.20 | 0.56 | 0.82 | −0.35 |
| 19 | 13.800 | 3.241 | | | | | |
| 20 | 43.364 | 3.079 | 1.6485 | 53.02 | 0.55 | 0.79 | −0.38 |
| 21 | −88.833 | D (21) | | | | | |

(Specification table)

| | INF | 0.2 m |
|---|---|---|
| F | 25.00 | — |
| Fno | 1.60 | — |
| ω | 18.06 | — |
| D (4) | 4.456 | 1.502 |
| D (17) | 14.896 | 17.844 |

(Lens group data)

| | |
|---|---|
| FG | 109.230 |
| Fa | 5439.520 |
| Fb | 26.396 |

TABLE 1

|  | First embodiment | Second embodiment | Third embodiment | Fourth embodiment | Fifth embodiment |
| --- | --- | --- | --- | --- | --- |
| Conditional Expression (1) θIRp − θIRn | 0.024 | 0.030 | 0.034 | −0.001 | 0.042 |
| Conditional Expression (2) Fb/F | 0.73 | 1.41 | 1.09 | 0.89 | 1.06 |
| Conditional Expression (3) 0.00558 × vd_n + 0.531−θct_n | −0.005 | −0.005 | −0.005 | −0.005 | −0.005 |
| Conditional Expression (4) θgF_p | 0.631 | 0.628 | 0.628 | 0.631 | 0.628 |
| Conditional Expression (5) nd_pave | 1.665 | 1.646 | 1.646 | 1.732 | 1.622 |
| Conditional Expression (6) vd_pave | 59.56 | 64.08 | 64.08 | 52.28 | 66.14 |
| Conditional Expression (7) θct | 0.815 | 0.815 | 0.815 | 0.815 | 0.815 |
| Conditional Expression (8) vd | 52.2 | 52.2 | 52.2 | 52.2 | 52.2 |
| Conditional Expression (9) Fa/F | 5.63 | −34.85 | 33.93 | 2.06 | 217.58 |

The optical system according to the present invention can be suitably applied as an imaging optical system of an imaging device equipped with an image sensor, for example, industrial cameras (FA/MV), video cameras, digital cameras, surveillance cameras, and other cameras.

What is claimed is:

1. An optical system comprising:
    a focus lens group having positive refractive power and configured to move along an optical axis when focusing from an infinite-distance object to a short-distance object, wherein
    the focus lens group integrally moves when focusing, and includes a lens subgroup A, an aperture stop, and a lens subgroup B in order from an object side,
    the lens subgroup A includes a negative lens, a positive lens, and a positive lens in order from an image side,
    the lens subgroup B includes a negative lens and a positive lens in order from the object side, and
    the optical system satisfies following conditional expressions:

$$-0.045 < \theta IRp - \theta IRn < 0.045 \quad (1)$$

$$0.50 < Fb/F < 2.50 \quad (2)$$

where
    θIRp is an average value of (nF−nd)/(n1700 nm−nd) of all positive lenses disposed in the lens subgroup B,
    θIRn is an average value of (nF−nd)/(n1700 nm−nd) of all negative lenses disposed in the lens subgroup B,
    nF is a refractive index on an F line,
    nd is a refractive index on a d line,
    n1700 nm is a refractive index at a wavelength of 1700 nm,
    Fb is a focal length on the d line of the lens subgroup B, and
    F is a focal length on the d line of the optical system.

2. The optical system according to claim 1 that satisfies a following conditional expression:

$$-0.007 < 0.00558 \times vd\_n + 0.531 - \theta ct\_n < 0.000 \quad (3)$$

where
    vd_n is an Abbe number on the d line of the negative lens disposed on the most object side in the lens subgroup B,
    θct_n is a partial dispersion ratio regarding a C line and a t line of the negative lens disposed on the most object side in the lens subgroup B, and
    a partial dispersion ratio θct from the C line to the t line is defined by a following expression:

$$\theta ct = (nC-nt)/(nF-nC)$$

nC is a refractive index on the C line, and
    nt is a refractive index on the t line.

3. The optical system according to claim 1, wherein the lens subgroup B includes at least one negative lens that satisfies following conditional expressions:

$$\theta ct \geq 0.800 \quad (7)$$

$$vd \leq 55 \quad (8)$$

wherein
    θct is a partial dispersion ratio from a C line to a t line of the negative lens, and
    the partial dispersion ratio θct from the C line to the t line is defined by a following expression:

$$\theta ct = (nC-nt)/(nF-nC)$$

nC is a refractive index on the C line,
    nt is a refractive index on the t line, and
    vd is an Abbe number on the d line.

4. The optical system according to claim 1 that satisfies a following conditional expression:

$$1.50 < Fa/F < 6.00 \quad (9)$$

where
    Fa is a focal length on the d line of the lens subgroup A.

5. The optical system according to claim 1, wherein a surface on the most image side of the lens subgroup A is concave with respect to the aperture stop, and a surface on the most object side of the lens subgroup B is concave with respect to the aperture stop.

6. The optical system according to claim 1, further comprising a fixed lens group fixed in an optical axis direction when focusing from an infinite-distance object to a short-distance object on the object side of the focus lens group, wherein
    the fixed lens group includes a negative lens and a positive lens in order from the object side.

7. An imaging device comprising:
    the optical system according to claim 1; and
    an image sensor configured to convert an optical image formed by the optical system on the image side of the optical system into an electrical signal.

8. The optical system according to claim 1, wherein the lens subgroup B includes at least four positive lenses as a whole.

9. The optical system according to claim 1, wherein the lens subgroup B has at least two cemented lenses.

* * * * *